United States Patent
Goetz et al.

(10) Patent No.: US 10,635,420 B2
(45) Date of Patent: Apr. 28, 2020

(54) OVERRIDING A MIGRATED METHOD IN AN UPDATED TYPE

(71) Applicant: Oracle International Corporation, Redwood Shores, CA (US)

(72) Inventors: Brian Goetz, Williston, VT (US); John R. Rose, San Jose, CA (US); Gavin Mark Bierman, Cambridge (GB)

(73) Assignee: Oracle International Corporation, Redwood Shores, CA (US)

(*) Notice: Subject to any disclaimer, the term of this patent is extended or adjusted under 35 U.S.C. 154(b) by 124 days.

(21) Appl. No.: 15/426,839

(22) Filed: Feb. 7, 2017

(65) Prior Publication Data

US 2018/0018163 A1    Jan. 18, 2018

Related U.S. Application Data

(60) Provisional application No. 62/361,087, filed on Jul. 12, 2016.

(51) Int. Cl.
*G06F 9/45* (2006.01)
*G06F 8/41* (2018.01)
(Continued)

(52) U.S. Cl.
CPC .............. *G06F 8/447* (2013.01); *G06F 8/437* (2013.01); *G06F 8/71* (2013.01); *G06F 9/449* (2018.02); *G06F 9/45504* (2013.01)

(58) Field of Classification Search
CPC . G06F 8/447; G06F 8/437; G06F 8/71; G06F 9/449; G06F 9/45504
See application file for complete search history.

(56) References Cited

U.S. PATENT DOCUMENTS 5,732,257 A    3/1998   Atkinson et al.
6,802,059 B1  10/2004   Lyapustina et al.
(Continued)

OTHER PUBLICATIONS

Cartwright et al., "Compatible Genericity with Run-Time Types for the JavaTM Programming Language", Object-Oriented Programming, Systems, Languages, and Applications Conference Proceedings, Oct. 1, 1998, pp. 201-215.
(Continued)

*Primary Examiner* — Lewis A Bullock, Jr.
*Assistant Examiner* — Tina Huynh
(74) *Attorney, Agent, or Firm* — Invoke

(57) ABSTRACT

Overriding a migrated method in an updated type is described. Instructions to invoke a particular method, in a sub-type, that overrides a migrated method, in a super-type, are identified. The instructions may invoke the particular method using a set of arguments associated with a particular set of types. The particular set of types is different from the set of parameter types associated with the particular method as defined in the sub-type. Additionally or alternatively, the instructions may include returning a value of a particular type from the particular method. The particular type is different from the return type associated with the particular method as defined in the sub-type. A new method is generated. The new method includes instructions for (a) converting the set of arguments and/or (b) converting the value returned from the particular method. The new method is stored in a runtime environment and executed.

17 Claims, 12 Drawing Sheets

(51) Int. Cl.
*G06F 9/455* (2018.01)
*G06F 9/448* (2018.01)
*G06F 8/71* (2018.01)

(56) References Cited

U.S. PATENT DOCUMENTS

| | | |
|---|---|---|
| 2001/0037412 A1 | 11/2001 | Miloushev et al. |
| 2002/0138819 A1 | 9/2002 | Hills |
| 2004/0015515 A1 | 1/2004 | Beisiegel et al. |
| 2007/0006138 A1* | 1/2007 | Ahe .................. G06F 9/4491 717/106 |
| 2007/0256060 A1* | 11/2007 | Ryu .................... G06F 8/437 717/140 |
| 2008/0222602 A1 | 9/2008 | Vaziri-Farahani et al. |
| 2012/0005660 A1* | 1/2012 | Goetz .................. G06F 8/437 717/140 |
| 2012/0174085 A1 | 7/2012 | Driesen et al. |

OTHER PUBLICATIONS

Dutchyn et al., "Multi-Dispatch in the Java Virtual Machine: Design and Implementation", 6th USENIX Conference on Object-Oriented Technologies, Jan. 29-Feb. 2, 2001, 16 pages.

* cited by examiner

```
┌─────────────────────────────────────────────────────────────────────┐
│   Identify, in a class file, instructions to invoke a particular    │
│   method using a set of arguments, wherein the set of arguments     │
│              is associated with a particular set of types           │
│                                 802                                 │
└─────────────────────────────────────────────────────────────────────┘
                                  │
                                  ▼
┌─────────────────────────────────────────────────────────────────────┐
│  Identify a sub-type including the particular method, wherein the   │
│   particular method is associated with a method name and a set of   │
│                          parameter types                            │
│                                 804                                 │
└─────────────────────────────────────────────────────────────────────┘
                                  │
                                  ▼
┌─────────────────────────────────────────────────────────────────────┐
│    Determine that a super-type includes a migrated method           │
│                 associated with the same method name                │
│                                 806                                 │
└─────────────────────────────────────────────────────────────────────┘
                                  │
                                  ▼
┌─────────────────────────────────────────────────────────────────────┐
│   Identify multiple versions of the migrated method, each           │
│         associated with different sets of parameter types           │
│                                 808                                 │
└─────────────────────────────────────────────────────────────────────┘
                                  │
                                  ▼
                                ( A )
```

FIG. 8A

OVERRIDING A MIGRATED METHOD IN AN UPDATED TYPE

BENEFIT CLAIM; RELATED APPLICATION; INCORPORATION BY REFERENCE

This application claims the benefit of U.S. Provisional Patent Application No. 62/361,087, filed Jul. 12, 2016, which is hereby incorporated by reference.

This application is related to U.S. Non-Provisional patent application Ser. No. 15/426,312, filed Feb. 7, 2017, which is hereby incorporated by reference.

TECHNICAL FIELD

The present disclosure relates to compiling and/or executing a type. In particular, the present disclosure relates to accessing a migrated member of an updated type.

BACKGROUND

A compiler converts source code, which is written according to a specification directed to the convenience of the programmer, to either machine or object code, which is executable directly by the particular machine environment, or an intermediate representation ("virtual machine code/instructions"), such as bytecode, which is executable by a virtual machine that is capable of running on top of a variety of particular machine environments. The virtual machine instructions are executable by the virtual machine in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine resides.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 8A-B illustrate a set of operations for invoking a particular method that overrides a migrated method in an updated type, in accordance with one or more embodiments.

DETAILED DESCRIPTION

Figure 1:
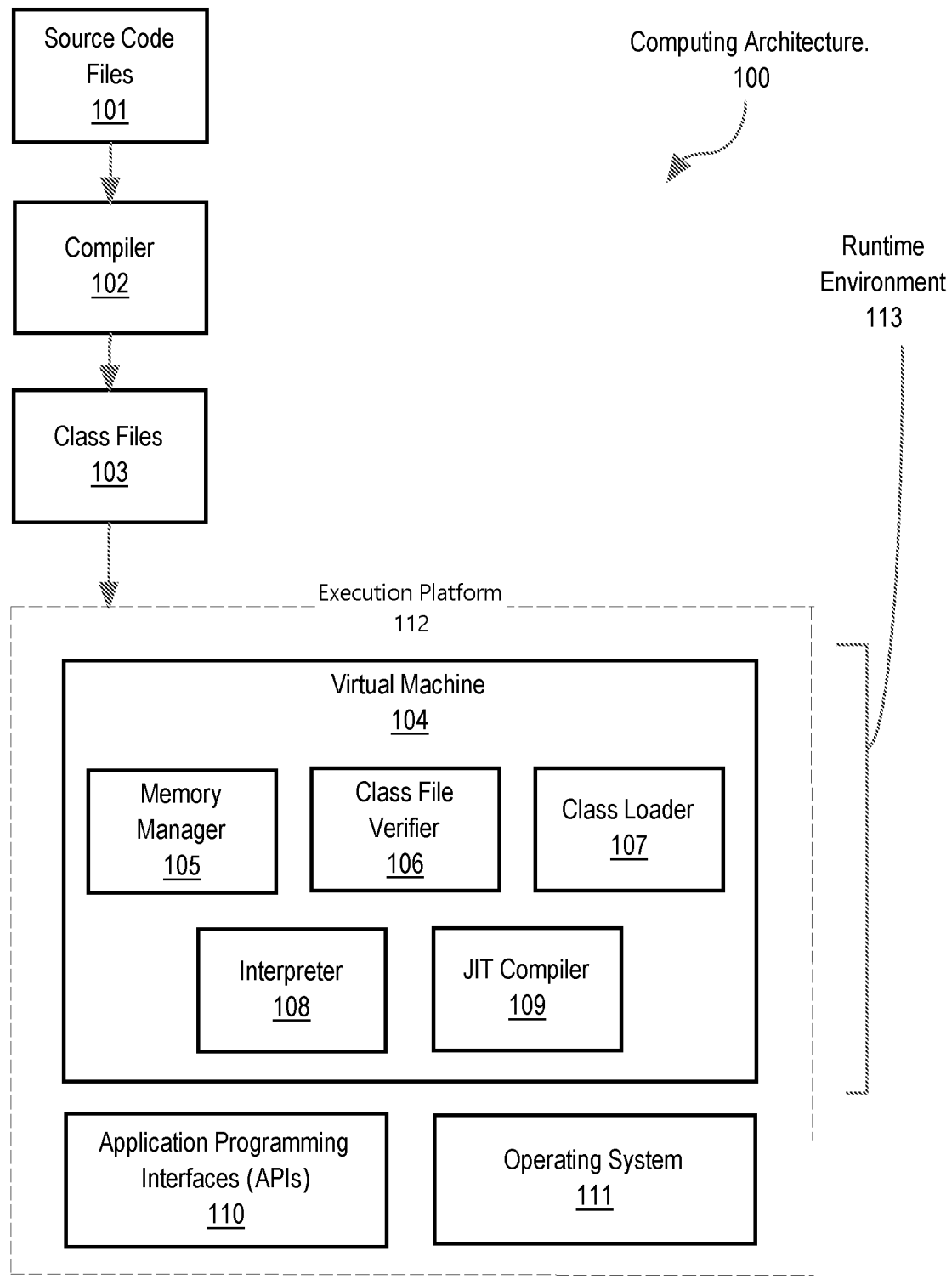
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. AN UPDATED TYPE AND A SUB-TYPE
4. COMPILING AN UPDATED TYPE
5. OVERRIDING A MIGRATED METHOD
6. MISCELLANEOUS; EXTENSIONS
7. HARDWARE OVERVIEW

1. General Overview

One or more embodiments include overriding a migrated method in an updated type. A migrated method is a method for which multiple versions exist. Multiple versions of the method within the same updated type may include, for example, (a) a current version and (b) an outdated version which has been migrated to the current version. Each version of the migrated method is associated with a same method name. An updated type, as referred to herein for purposes of explanation, is a type that includes multiple versions of a migrated method.

One or more embodiments include invoking a particular method using a set of arguments, wherein the particular method overrides a migrated method in an updated type. The particular method, as defined in a sub-type, is associated with a set of parameter types. Different versions of the migrated method, as defined in a super-type, are associated with different sets of parameter types. A conversion function that converts (a) the set of arguments used to invoke the particular method into (b) values of the set of parameter types associated with the particular method is identified from the super-type. A new method is generated, wherein the new method includes: (a) converting the set of arguments into values of the set of parameter types associated with the particular method, and (b) invoking the particular method using the converted values. The new method is stored in a run-time environment. The new method is executed.

One or more embodiments include returning a value from a particular method as a value of a particular type, wherein the particular method overrides a migrated method in an updated type. The particular method, as defined in a sub-type, is associated with a return type. Different versions of the migrated method, as defined in a super-type, are associated with different return types. A conversion function that converts (a) a value returned by the particular method into (b) a value of the particular type is identified from the super-type. A new method is generated, wherein the new method includes: (a) invoking the particular method, and (b) converting the value returned by the particular method into a value of the particular type. The new method is stored in a run-time environment. The new method is executed.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C #, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "type" defined in the source code files 101 (or dynamically generated by the compiler 102/virtual machine 104). Examples of "types" include a class and an interface. A class is a template for the properties and behaviors of objects associated with the class. The class includes fields and methods associated with the objects of the class. An interface includes abstract methods that may be implemented by a class. A class that implements an interface inherits the abstract methods of the interface and provides a body to each abstract method. However, the aforementioned assumption is not a strict requirement and will depend on the implementation of the virtual machine 104. Thus, the techniques described herein may still be performed regardless of the exact format of the class files 103.

Types may be updated to include multiple fields with a same field name but different field types. Additionally or alternatively, types may be updated to include multiple methods with a same method name but different parameter types and/or return types. Embodiments herein relate to accessing a member of an updated type.

In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
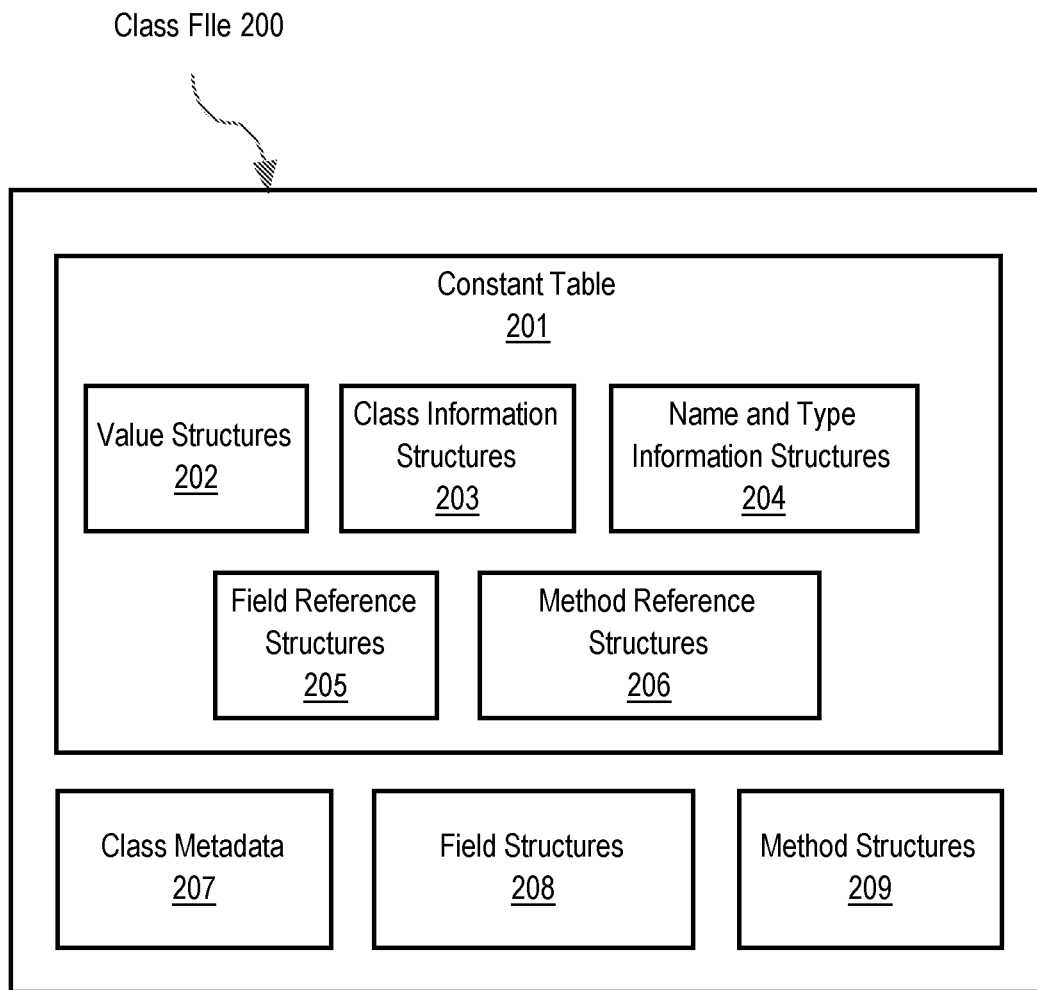
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a set or list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { ... }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
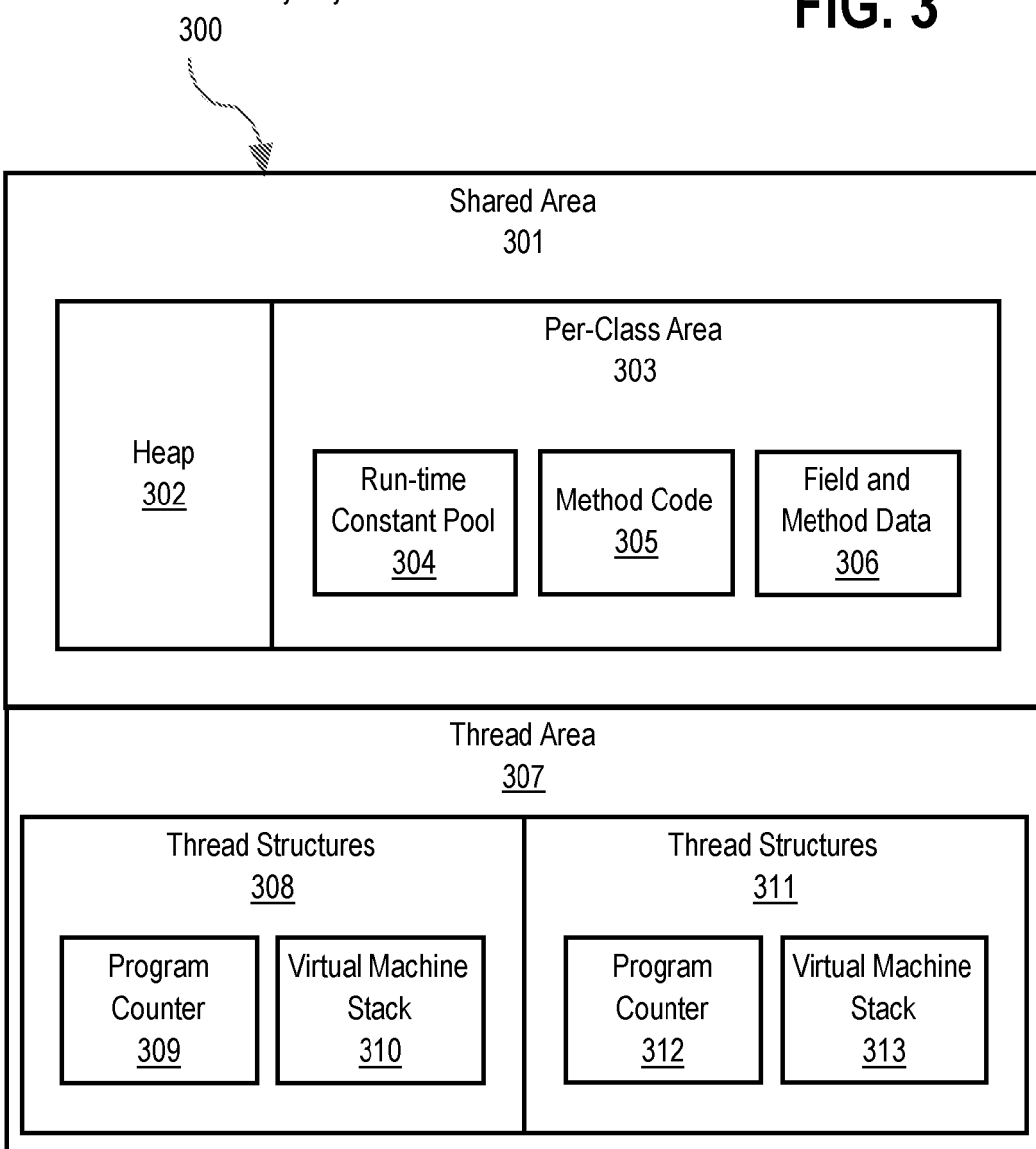
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
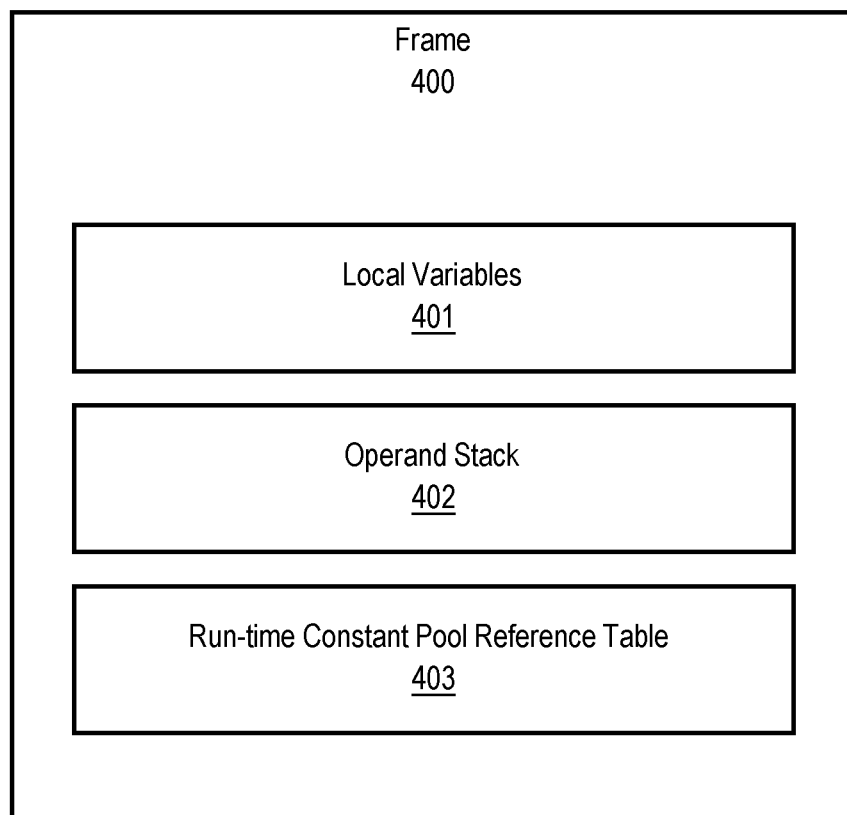
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. An Updated Type and a Sub-Type

Figure 5:
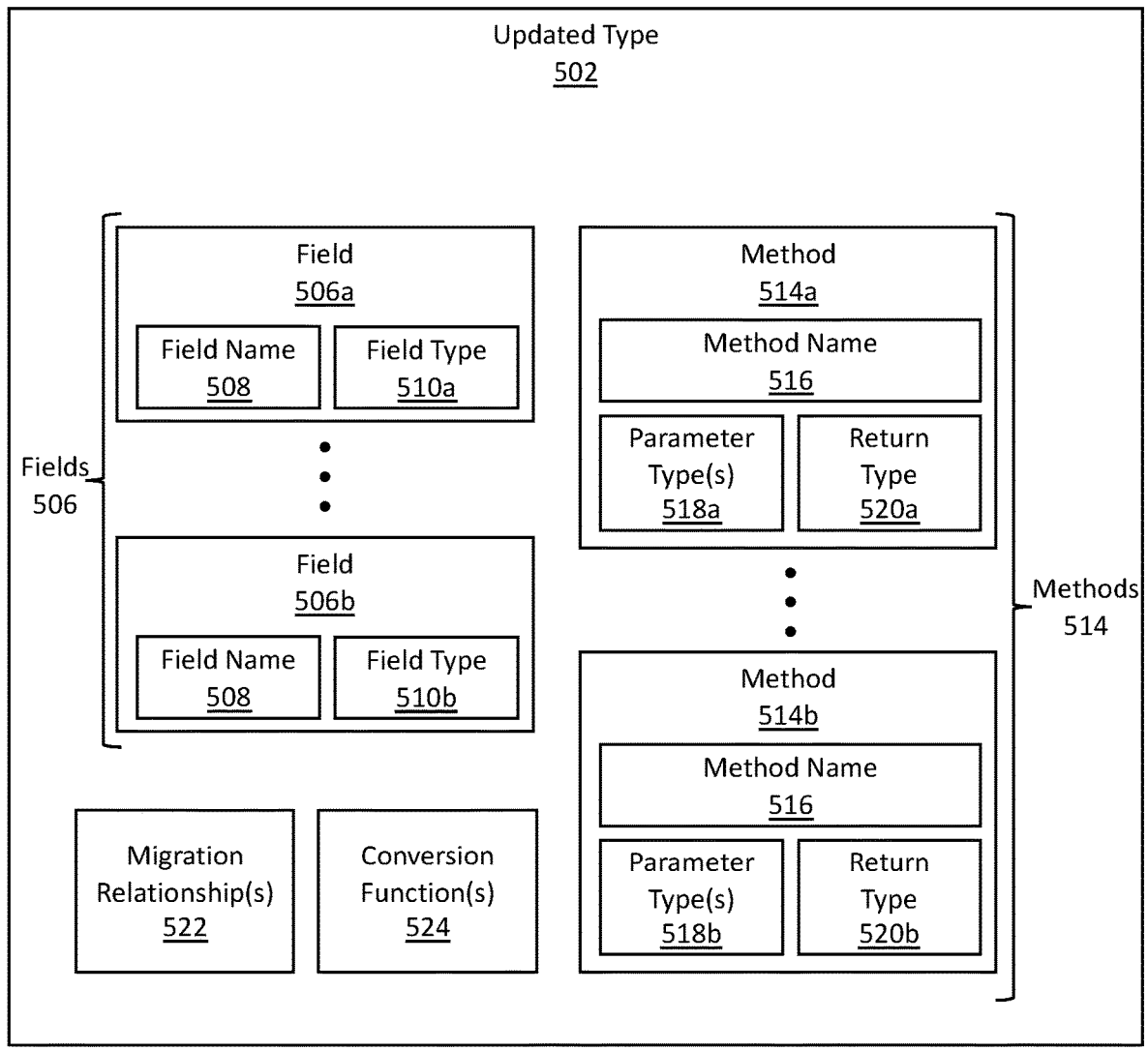
FIG. 5 illustrates an example of an updated type, in accordance with one or more embodiments.

FIG. 5 illustrates an example of an updated type, in accordance with one or more embodiments. As illustrated, an updated type 502 includes fields 506, methods 514, one or more migration relationships 522, and one or more conversion functions 524. In one or more embodiments, the updated type 502 may include more or fewer components than the components illustrated in FIG. 5. As an example, an updated type may include fields 506 without including methods 514. Alternatively, an updated type may include methods 514 without including fields 506.

In one or more embodiments, each of fields 506 (such as fields 506a-b) is associated with a same field name 508 but different field types (such as field types 510a-b). Each field 506 may be referred to as a different version of a "migrated field."

As an example, an updated type 502 may include two fields with a same field name, fd. One of the two fields may be associated with the field type Date. The other of the two fields may be associated with the field type NewDate. The field type Date may include month and year only. The field type NewDate may include month, date, and year. Example code including the above-described migrated field may be written as follows:

```
class Account {
    Date fd;
    @MigratedFrom (Date fd, ConversionFunctionPair)
    NewDate fd;
}
```

In the above example, the line beginning with @MigratedFrom may be used to identify a migration relationship 522 between Date fd and NewDate fd. Migration relationships 522 are further described below.

In one or more embodiments, each of methods 514 (such as methods 514a-b) is associated with a same method name 516. But each method is associated with different sets of parameter types (such as parameter types 518a-b) and/or different return types (such as return types 520a-b). A set of parameter types includes one or more parameter types corresponding respectively to one or more parameters that are input to a method. A return type corresponds to a value returned by a method. The term "method descriptor" refers to (a) the method name, (b) the set of parameter types, and (c) the return type associated with a particular method. Each method, which is associated with a same method name but a different method descriptor, may be referred to as a different version of a "migrated method."

As an example, an updated type includes two methods with a same method name, getAccess. One of the two methods is associated with one parameter of the parameter type byte. The method is further associated with a return type of Date. The other of the two methods is associated with two parameters, of the parameter types char and String respectively. The method is further associated with a return type of NewDate. Example code including the above-described migrated method may be written as follows:

```
class Account {
    Date getAccess(byte arg1) { ... };
    @MigratedFrom (Date getAccess(byte arg1),
        ParameterConversionFunctionPair,
        ReturnConversionFunctionPair)
    NewDate getAccess(char arg1, String arg2) { ... };
}
```

In the above example, the line beginning with @MigratedFrom may be used to identify a migration relationship 522 between Date getAccess (byte arg1) and NewDate getAccess (char arg1, String arg2). Migration relationships 522 are further described below.

In one or more embodiments, additional and/or alternative migrated members may be included in the updated type 502. A member in a type is an inheritable component of the type. A member in a type is inherited by a sub-type, given that there are no access restrictions to the member based on access level modifiers. A member in a type may be directly declared in the body of the type. Additionally or alternatively, a member may be included in the type via inheritance. Examples of members include a field, a method, a nested class, an interface, and an enumerated type. An updated type 502 is a type that includes one or more migrated members.

In one or more embodiments, a migration relationship 522 indicates a sequence in which each version of a migrated member was created. Additionally or alternatively, a migration relationship 522 identifies which particular version of a migrated member was migrated from another version of the migrated member. As an example, a migration relationship may indicate that field 506b was migrated from field 506a. Another migration relationship may indicate that method 514b was migrated from method 514a.

A migration relationship 522 may be specified in a migration tag that is associated with one or more versions of a migrated member. As described above, example code including a migration tag may be written as follows:

```
class Account {
    Date fd;
    @MigratedFrom (Date fd, ConversionFunctionPair)
    NewDate fd;
}
```

The line beginning with @MigratedFrom is a migration tag associated with NewDate fd. In the parentheses, the term "Date fd" indicates that NewDate fd was migrated from Date fd. Also in the parentheses, the term "ConversionFunctionPair" identifies a pair of conversion functions. The term "ConversionFunctionPair" may be, for example, a reference to a pair of conversion functions. Conversion functions are further described below.

Also described above, example code including a migration tag may be written as follows:

```
class Account {
    Date getAccess(byte arg1) { ... };
    @MigratedFrom (Date getAccess(byte arg1),
        ParameterConversionFunctionPair,
        ReturnConversionFunctionPair)
    NewDate getAccess(char arg1, String arg2) { ... }
}
```

The line beginning with @MigratedFrom is a migration tag associated with NewDate getAccess (char arg1, String arg2). In the parentheses, the term "Date getAccess (byte arg1)" indicates that NewDate getAccess (char arg1, String arg2) was migrated from Date getAccess (byte arg1). Also in the parentheses, the term "ParameterConversionFunctionPair" identifies a pair of conversion functions for parameter types of the migrated method. The term "ReturnConversionFunctionPair" identifies a pair of conversion functions for return types of the migrated method. Conversion functions are further described below.

In an embodiment, a migrated member may be associated with three or more versions. Migration relationships between the different versions may be specified using multiple migration tags. As an example, a migrated member may be a field named fd. The versions associated with the migrated member may be: int fd; Date fd; NewDate fd. One migration tag associated with Date fd may indicate that Date fd was migrated from int fd. Another migration tag associated with NewDate fd may indicate that NewDate fd was migrated from Date fd.

Additionally or alternatively, a migration relationship 522 may be specified in a file and/or database that is separate from the file including the updated type 502. As an example, a separate file may store a version list. The version list may be a sequenced list of versions of a migrated member. As an example, a sequenced list may include: int fd; Date fd; NewDate fd. The sequenced list may indicate that int fd is the earliest version of the migrated field fd; Date fd is a subsequent version of the migrated field fd; and NewDate fd is the current version of the migrated field fd.

In one or more embodiments, a conversion function 524 converts values of a particular set of types into values of another set of types.

As an example, a conversion function may convert a double value into an int value. The double type may be a signed 64-bit two's complement integer, while the int type may be a signed 32-bit two's complement integer. The range of the int type may be −2,147,483,648 to +2,147,483,647. When converting a double value into an int value, the double value is compared to the range of the int type. If the double value is within the range of the int type, then the least significant 32-bits of the double value may be determined as the converted int value. If the double value is above the maximum value of the int type, then the maximum value of the int type (+2,147,483,647) may be determined as the converted int value. If the double value is below the minimum value of the int type, then the minimum value of the int type (−2,147,483,648) may be determined as the converted int value.

As another example, a conversion function may convert an int value into a double value. If the int value is a positive number, then the conversion function may pad thirty-two zeroes in front of the int value. If the int value is a negative number, then the conversion function may pad thirty-two ones in front of the int value. The padded int value may be determined as the converted double value.

A pair of conversion functions includes a projection function and an embedding function. The embedding function performs a reverse conversion as compared to the projection function. The embedding function that converts a value of a first type into a value of a second type. Conversely, the projection function that converts a value of the first type into a value of the second type. However, the embedding function and the projection function may not be exact inverses of each other. The embedding function and the projection function have the following properties, as described below.

Given a first value of the first type, an embedding function may be applied to the first value. A projection function may be applied to the result of the embedding function. The result of this application of the projection function is the first value itself.

Given a second value of the second type, a projection function may be applied to the second value. An embedding function may be applied to the result of the projection function. The result of this application of the embedding function is either the second value itself, or a value similar and/or related to the second value.

The following example illustrates the above properties of an embedding function and a projection function. As an example, an embedding function may convert an int value into a double value. A projection function may convert a double value into an int value.

An initial int value may be a binary number including thirteen zeroes in the most significant bits, followed by nineteen ones in the least significant bits (which is 524,287 in decimal). The embedding function may be applied to the initial int value. Based on the embedding function, thirty-two zeros may be padded in front of the int value. The converted double value may be a binary number including forty-five zeroes in the most significant bits, followed by nineteen ones in the least significant bits (which is 524,287 in decimal). The projection function may be applied to the converted double value. Based on the projection function, the double value may be compared to the range of the int type. Since the double value is within the range, the least significant 32-bits of the double value may be determined as the converted int value. The converted int value may be a binary number including thirteen zeroes in the most significant bits, followed by nineteen ones in the least significant bits (which is 524,287 in decimal). Hence, the output of the projection function is the same as the initial int value.

Conversely, an initial double value may be a binary number including thirty zeroes in the most significant bits, and thirty-four ones in the least significant bits (which is 17,179,869,184 in decimal). The projection function may be applied to the initial double value. Based on the projection function, the double value may be compared to the range of the int type. Since the double value is above the maximum value of the int type, the maximum value of the int type may be determined as the converted int value. The converted int value may be one zero in the most significant bit, followed by thirty-one ones in the least significant bits (which is 2,147,483,647 in decimal). The embedding function may be applied to the converted int value. Based on the embedding function, thirty-two zeroes may be padded in front of the int value. The converted double value may be a binary number including thirty-three zeroes in the most significant bits, followed by thirty-one ones in the least significant bits (which is 2,147,483,647 in decimal). The output of the embedding function is different from the initial double value. Hence, the output of the embedding function is not the same as the initial double value. The output of the embedding function is related to the initial double value, in that (a) the initial double value exceeds the maximum value of the int type, and (b) the output of the embedding function is the maximum value of the int type.

In an embodiment, a conversion function converts a set of values of a particular set of types into another set of values of another set of types. The number of values in the input of a conversion function may be the same as or different from the number of values in the output of a conversion function. As an example, a conversion function may convert (a) an int value into (b) a double value and a String value. If the int value is a positive number, thirty-two zeroes may be padded in front of the int value to obtain the converted double value. If the int value is a negative number, thirty-two ones may be padded in front of the int value to obtain the converted double value. Additionally, the conversion function may set the String value to null. The output of the conversion function includes both the converted double value and the String value that is set to null.

In an embodiment, a chain of conversion functions may be used to convert a value of one type into a value of another type. As described above, a migrated member may be associated with three or more versions. One conversion function may convert between two particular versions. Another conversion function may convert between two other versions. The two conversion functions may be chained together. As an example, a migrated member may be a field named fd. The versions associated with the migrated member may be: int fd; Date fd; NewDate fd. A first conversion function may convert an int value into a Date value. A second conversion function may convert a Date value into a NewDate value. To convert a particular int value into a NewDate value, the first conversion function may be applied to the particular int value, and the second conversion function may be applied to the result of the first conversion function. Hence, the first and second conversion functions are chained together to convert an int value into a NewDate value.

Figure 6:
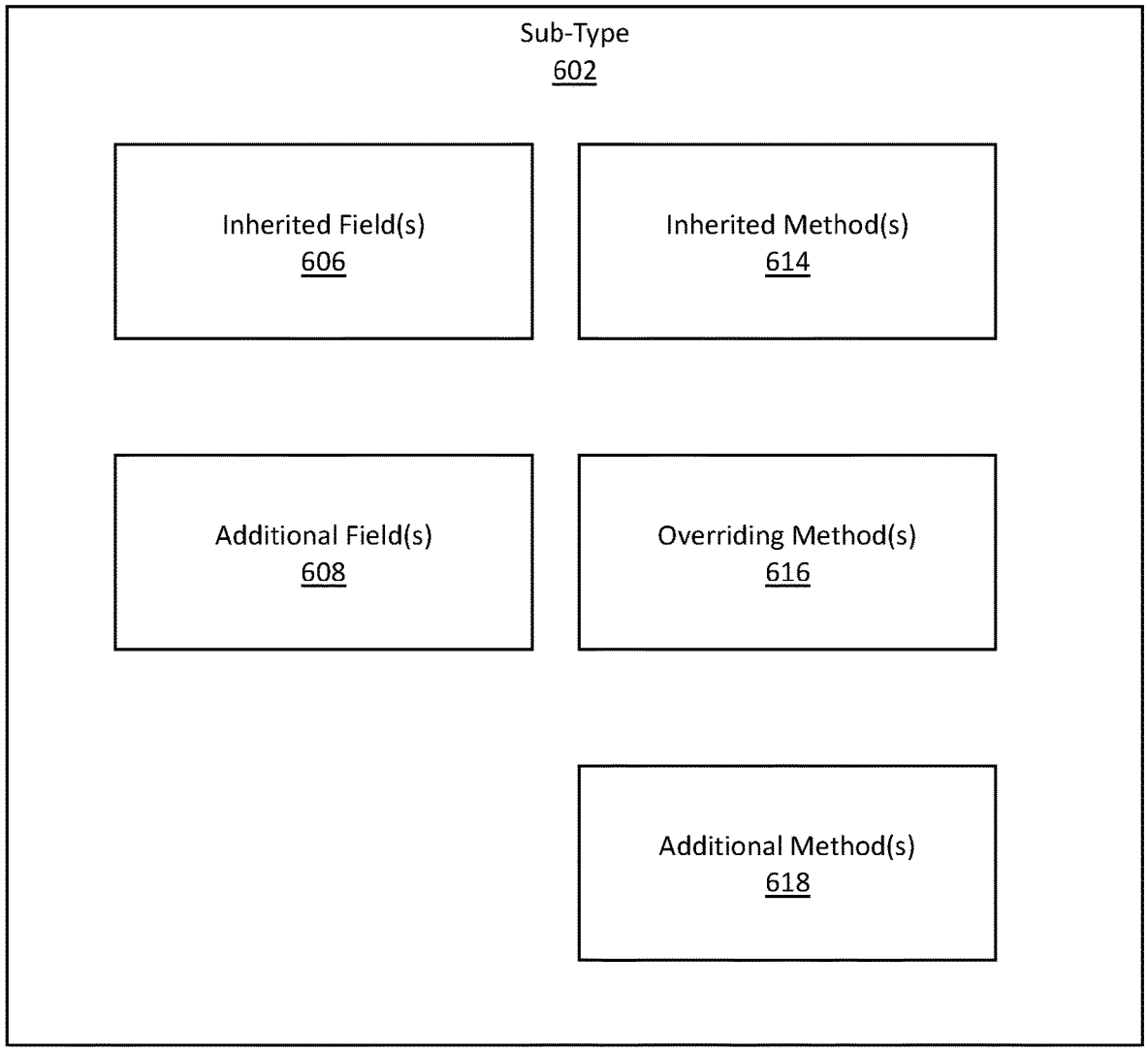
FIG. 6 illustrates an example of a sub-type, in accordance with one or more embodiments.

FIG. 6 illustrates an example of a sub-type, in accordance with one or more embodiments. As illustrated, a sub-type 602 includes inherited field(s) 606, additional field(s) 608, inherited method(s) 614, overriding method(s) 616, and/or additional method(s) 618. In one or more embodiments, the sub-type 602 may include more or fewer components than the components illustrated in FIG. 6.

In one or embodiments, a sub-type 602 is a type that is derived from another type. The other type may be referred to as a "super-type." A sub-type 602 inherits members from the super-type. Inheritance is further described below with reference to inherited fields 606 and inherited methods 614.

In one or more embodiments, an inherited field 606 is a field that is included in a sub-type 602 by virtue of being included in the super-type. The inherited field 606, in the sub-type 602, is associated with the same field name and field type as the field in the super-type. The source code for the sub-type 602 may but does not necessarily include code explicitly declaring the inherited field 606.

In one or more embodiments, an additional field 606 is a field that is included in a sub-type 602 but is not included in the super-type. The source code for the sub-type 602 includes code explicitly declaring the additional field 606.

As an example, the source code defining a particular super-type may include a field parent_fd. The source code defining the sub-type, of the particular super-type, may include a field child_fd. The source code defining the sub-type does not include any reference of the field parent_fd. A set of source code may include a declaration of an object of the sub-type. The object, declared by the set of source code, may be associated with both parent_fd and child_fd.

In one or more embodiments, an inherited method 614 is a method that is included in a sub-type 602 by virtue of being included in the super-type. The inherited method 614, in the sub-type 602, is associated with the same method name, parameter type(s), and return type as the method in the super-type. The inherited method 614, in the sub-type 602, is associated with a same method body as the method in the super-type. The source code for the sub-type 602 may but does not necessarily include code explicitly declaring the inherited method 614.

In one or more embodiments, an overriding method 616 is a method in a sub-type 602 that overrides a method in the super-type. The overriding method 616, in the sub-type 602, is associated with the same method name, parameter type(s), and return type as the method in the super-type. However, the inherited method 614, in the sub-type 602, is associated with a different method body than the method in the super-type. The source code for the sub-type 602 includes code explicitly declaring the overriding method 616. The source code for the sub-type 602 defines the method body of the overriding method 616. The source code for the sub-type 602 may include an annotation indicating that the overriding method 616 is intended to override a particular method of the super-type.

In one or more embodiments, an additional method 618 is a method that is included in a sub-type 602 but is not included in the super-type. The source code for the sub-type 602 includes code explicitly declaring the additional method 618.

As an example, a super-type may be BankAccount. The source code defining the super-type may include a method lastAccessDate and creationDate. The method lastAccessDate may be configured to return a last access date of a bank account. The method creationDate may be configured to return a creation date of a bank account.

Additionally, a sub-type of BankAccount may be HighSecurityAccount. The source code defining the sub-type may include a method lastAccessDate and changePass. The method lastAccessDate, in the sub-type, may be annotated to signal overriding of the method lastAccessDate in the super-type. The method lastAccessDate, in the sub-type, may be configured to check the credentials of a requestor prior to returning a last access date of a bank account. The method changePass may be configured to change a password of a bank account. The source code defining the sub-type does not include any reference of the method creationDate.

Example code for BankAccount and HighSecurityAccount may be written as follows:

```
class BankAccount {
    Date lastAccessDate(int arg) { ... };
    Date creationDate( ) { ... };
}
class HighSecurityAccount extends BankAccount {
    @Override Date lastAccessDate(int arg) {
        ...        // check credentials first
    };
    int changePass( ) { ... };
}
```

Continuing the example, a set of source code may include a declaration of an object of the sub-type. Example code for the declaration of the object may be written as follows:

```
class Main {
    public static void main(String[ ] args) {
        HighSecurityAccount myaccount =
            new HighSecurityAccount( );
    }
}
```

The object, myaccount, may be associated with creationDate, changePass, and lastAccessDat). The version of lastAccessDate that is invoked, using the object, may be the version included in the sub-type HighSecurityAccount. The version of lastAccessDate that is invoked may be the version that is configured to check the credentials of a requestor prior to returning a last access date of a bank account.

In an embodiment, a method in a sub-type overrides a migrated method in a super-type. As an example, a super-type may be BankAccount. The source code defining the super-type may include a migrated method associated with the method name, lastAccessDate. The super-type may also be referred to as an "updated type."

Additionally, a sub-type of BankAccount may be HighSecurityAccount. The source code defining the sub-type may include a method, lastAccessDate. The method lastAccessDate, in the sub-type, may be annotated to signal overriding of the migrated method lastAccessDate in the super-type. The method lastAccessDate, in the sub-type, may be configured to check the credentials of a requestor prior to returning a last access date of a bank account.

Example code for BankAccount and HighSecurityAccount may be written as follows:

```
class BankAccount {
    Date lastAccessDate(int arg) { ... };
    @MigratedFrom (Date lastAccessDate(int arg),
        ParameterConversionFunctionPair,
        ReturnConversionFunctionPair)
    NewDate lastAccessDate(long arg) { ... };
}
class HighSecurityAccount extends BankAccount {
    @Override Date lastAccessDate(int arg) {
        ...        // check credentials first
    };
}
```

In this example, the method lastAccessDate in the sub-type and one version of the migrated method lastAccessDate in the super-type are associated with the same method descriptor (that is, method name, parameter type(s), and return type). The method lastAccessDate in the sub-type may be referred to as overriding a migrated method in the updated type.

4. Compiling an Updated Type

Figure 7:
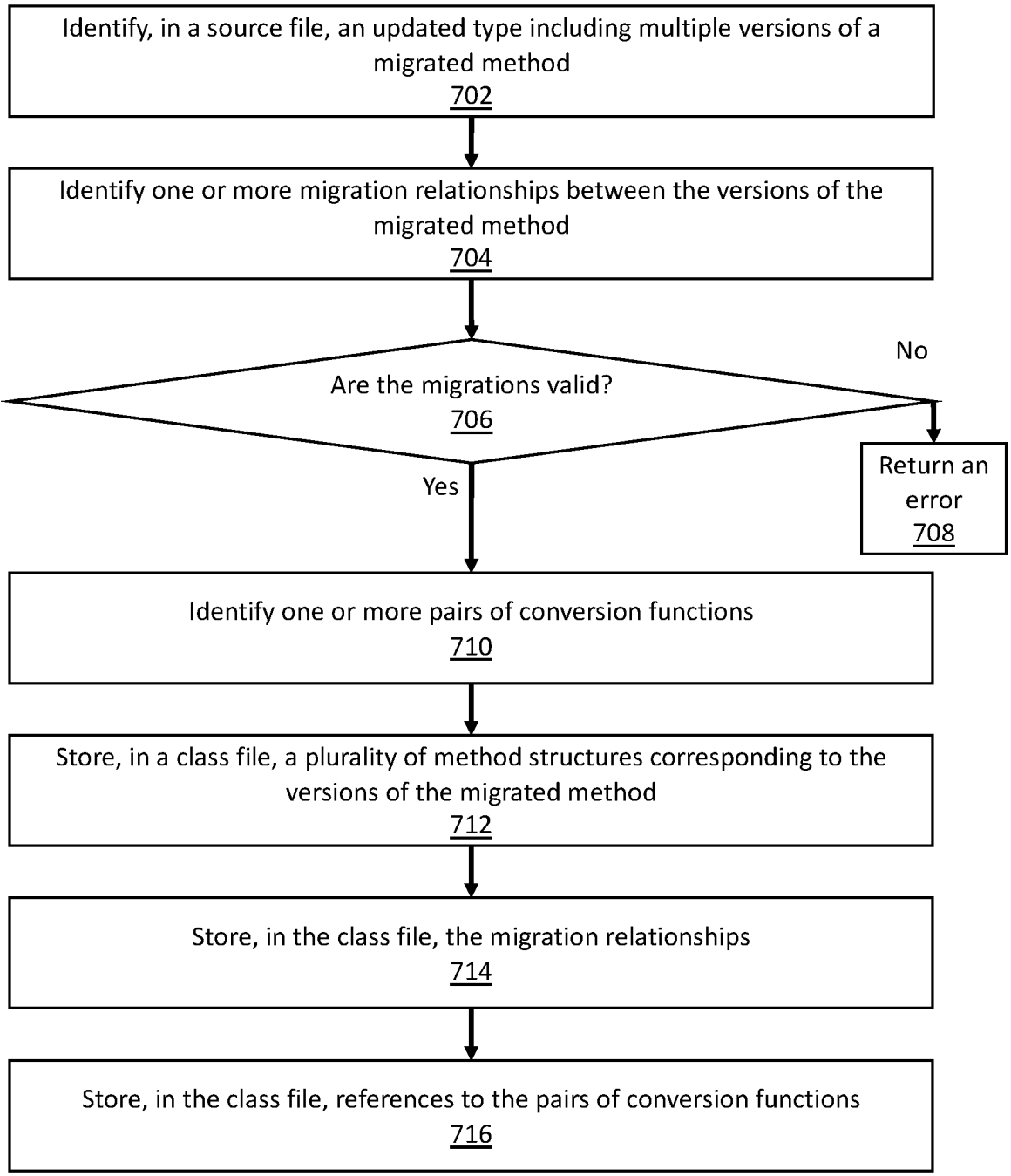
FIG. 7 illustrates a set of operations for compiling an updated type comprising an migrated method, in accordance with one or more embodiments.

FIG. 7 illustrates a set of operations for compiling an updated type comprising a migrated method, in accordance with one or more embodiments. One or more operations illustrated in FIG. 7 may be modified, rearranged, or omitted all together. Accordingly, the particular sequence of operations illustrated in FIG. 7 should not be construed as limiting the scope of one or more embodiments.

One or more embodiments include identifying, in a source file, an updated type including multiple versions of a migrated method (Operation 702). Identifying the updated type may be performed as part of a process to compile the updated type.

In an embodiment, the updated type includes multiple versions of a migrated field, each associated with a same field name but different field types, as explained above with reference to fields 506 in FIG. 5. Additionally or alternatively, the updated type includes multiple versions of a migrated method, each associated with a same method name but different parameter types and/or different return types, as explained above with reference to methods 514 in FIG. 5.

One or more embodiments include identifying one or more migration relationships between the versions of the migrated method (Operation 704). A migration relationship is identified based on one or more migration tags that are associated with one or more versions of the migrated method. The migration tag indicates a sequence in which the versions of the migrated method were generated. Additionally or alternatively, the migration relationship is identified from a separate file and/or database.

One or more embodiments include determining whether the migrations are valid (Operation 706).

In an embodiment, a migration may be invalid if a version of a migrated method was associated with a security setting that prohibited migration. For example, a version of the migrated method may be marked with an "Unmigratable" tag.

In an embodiment, a migration may be invalid if different versions of a migrated method are associated with conflicting migration relationships. As an example, an updated type may include two methods with a same method name, md. A first md method may be associated with a return type Date. A second md method may be associated with a return type NewDate. The second md method may be associated with a migration tag that indicates the second md method was migrated from the first md method. Meanwhile, the first md method may be associated with a migration tag that indicates the first md method was migrated from the second md method. The two migration tags indicate conflicting migration relationships. The migration is invalid.

If the migration is not valid, then an error is returned (Operation 708). The source file is not successfully compiled.

One or more embodiments include identifying one or more pairs of conversion functions (Operation 710). The pairs of conversion functions may be used to convert between the different versions of the migrated method. References to the conversion functions are identified from the source file including the updated type. As an example, references to conversion functions may be identified from a migration tag associated with a version of a migrated method. Based on the references to the conversion functions, the conversion functions may be identified from the source file itself or a different file.

One or more embodiments include storing, in a class file, a set of method structures corresponding to the versions of the migrated method (Operation 712).

In an embodiment, the updated type includes multiple fields, each associated with a same field name. The multiple fields are different versions of a migrated field. Compilation of the multiple fields associated with the same field name does not cause a generation of an error. Rather, a set of field structures, corresponding to the versions of the migrated field, are stored in the compiled class file.

In an embodiment, the updated type includes multiple methods, each associated with a same method name but different parameter types and/or return types. The multiple methods are different versions of a migrated method. A set of method structures, corresponding to the versions of the migrated method, are stored in the compiled class file. As an example, an updated type may include multiple methods associated with a same method signature. The term "method signature" refers to (a) the method name of a method, and (b) the set of parameter types associated with the method. The methods may be associated with different return types. The methods are different versions of a migrated method. Compilation of the multiple methods associated with the same method signature does not cause a generation of an error. Rather, a set of method structures, corresponding to the versions of the migrated method, may be stored in a compiled class file.

One or more embodiments include storing, in the class file, the migration relationships (Operation 714). The migration relationships may be stored as migration tags in the class file. Additionally or alternatively, the migration relationships may be stored as a version list in the class file. Additionally or alternatively, other formats may be used for storing the migration relationships.

One or more embodiments include storing, in the class file, references to the pairs of conversion functions (Operation 716). The references to the pairs of conversion functions may be stored in a constant pool table of the class file. Additionally or alternatively, other formats may be used for storing the references to the pairs of conversion functions.

In an embodiment, the conversion functions themselves may be stored in the class file. In another embodiment, the conversion functions are stored in a separate file and/or database.

5. Overriding a Migrated Method

Figure 8B:
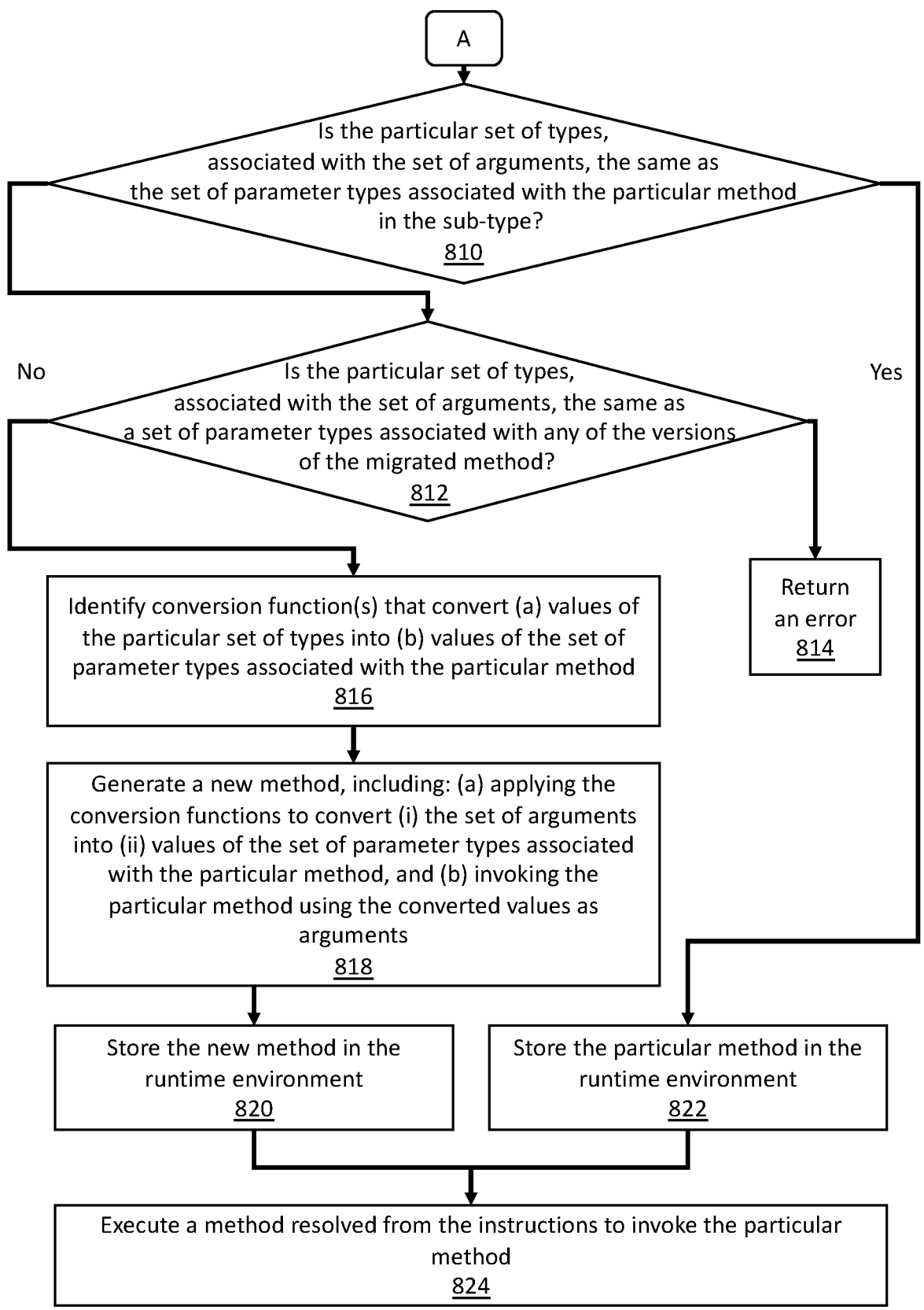

FIGS. 8A-B illustrate a set of operations for invoking a particular method that overrides a migrated method in an updated type, in accordance with one or more embodiments. Different versions of the migrated method are associated with different sets of parameter types. One or more operations illustrated in FIGS. 8A-B may be modified, rearranged, or omitted all together. Accordingly, the particular sequence of operations illustrated in FIGS. 8A-B should not be construed as limiting the scope of one or more embodiments.

As further described below, a method corresponding to a sub-type is invoked using (a) a particular method name and (b) a particular set of parameter type(s). The sub-type includes a method associated with the particular method name, but with a different set of parameter type(s). Meanwhile, the super-type is an updated type that includes a migrated method. One version of the migrated method is associated with the particular method name and the same particular set of parameter type(s). A new method is generated to convert the parameter types for input to the method in the sub-type.

One or more embodiments include identifying, in a class file, instructions to invoke a particular method using a set of arguments, wherein the set of arguments is associated with a particular set of types (Operation 802). Identifying the instructions in the class file may be performed as part of a process to execute the class file. In an embodiment, the instructions are identified from the body of a main method. The main method is a method that is initially called by the runtime environment. In another embodiment, the instructions are identified from the body of another method that is called by the main method. The instructions identify (a) a method name of the particular method, (b) the set of arguments, and (c) the particular set of types associated with the set of arguments.

Example code may be written as follows:

```
class Main {
    public static void main(String[ ] args) {
        HighSecurityAccount myaccount =
            new HighSecurityAccount( );
        long myarg = 3;
        Date dt = myaccount.lastAccessDate(myarg);
    }
}
```

The example code may be compiled into bytecode, which may be stored in a class file. The instructions to invoke the particular method using the set of arguments include the bytecode corresponding to the line Date dt=myaccount.lastAccessDate (myarg). The bytecode corresponding to the line Date dt=myaccount.lastAccessDate (myarg) may include, for example, a load instruction and an invoke instruction. Based on the line Date dt=myaccount.lastAccessDate (myarg), an argument of a particular type, long, is loaded onto an operand stack. Further, a particular method, lastAccessDate, corresponding to the object, myaccount, is executed using the loaded value as an argument. Hence, the instructions identify (a) lastAccessDate as the particular method being invoked, (b) myarg as the set of arguments, and (c) long as the particular set of types associated with the set of arguments.

One or more embodiments include identifying a sub-type including the particular method, wherein the particular method is associated with a method name and a set of parameter types (Operation 804). The sub-type including the particular method is identified based on a declaration of the object corresponding to the particular method. The declaration of the object indicates a type (which may be a sub-type) associated with the object. A process for loading the sub-type into the runtime environment is initiated.

Referring to the example code above, the particular method, lastAccessDate, corresponds to the object, myaccount. A declaration of myaccount is the line HighSecurityAccount myaccount=new HighSecurityAccount( ). Based on the declaration of myaccount, the type of myaccount is determined as HighSecurityAccount. HighSecurityAccount is the sub-type including the method lastAccessDate.

A definition of the particular method is determined from the sub-type. The definition of the particular method indicates the method name and the set of parameter types associated with the particular method. The definition of the particular method also includes the method body of the particular method.

As an example, the sub-type HighSecurityAccount may include the following code:

```
class HighSecurityAccount extends BankAccount {
    @Override Date lastAccessDate(int arg) {
        ...        // check credentials first
    };
}
```

The example code may be compiled into bytecode, which may be stored in a class file. The particular method is defined by the bytecode corresponding to Date lastAccessDate (int arg) and the method body thereof. The method body may include instructions to check the credentials of a requestor prior to returning a last access date of an account. Based on the line Date lastAccessDate (int arg), the set of parameter types associated with the particular method is int.

One or more embodiments include determining that a super-type includes a migrated method associated with the same method name (Operation 806). The super-type is identified based on the definition of the sub-type. The definition of the sub-type indicates the super-type of the sub-type. As an example, the line class HighSecurityAccount extends BankAccount indicates that BankAccount is a super-type of HighSecurityAccount.

If the super-type is not yet loaded, then the super-type is loaded into a per-class area of the runtime environment.

A set of methods, associated with the same method name as the particular method in the sub-type, are identified in the super-type. The set of methods are different versions of a migrated method in the super-type. Since the super-type includes a migrated method, the super-type may also be referred to as an "updated type."

Referring to the example code above, a sub-type may be HighSecurityAccount, which includes a method lastAccessDate. The super-type of HighSecurityAccount may be BankAccount. BankAccount may be an updated type including a migrated method associated with the same method name, lastAccessDate. BankAccount may include the following code:

```
class BankAccount {
    Date lastAccessDate(int arg) { ... };
    @MigratedFrom (Date lastAccessDate(int arg),
        ParameterConversionFunctionPair)
    Date lastAccessDate(long arg) { ... };
}
```

One or more embodiments include identifying multiple versions of the migrated method, each associated with different sets of parameter types (Operation 808). Multiple versions of the migrated method are identified from the super-type. Each version of the migrated method is associated with a same method name but different sets of parameter types and/or different return types.

Referring to the example code above, BankAccount includes multiple versions of a migrated method associated with the method name, lastAccessDate. One version corresponds to the line Date lastAccessDate (int arg). This version is associated with the set of parameter types, (int). Another version corresponds to the line Date lastAccessDate (long arg). This version is associated with the set of parameter types, (long). The versions of the migrated method are identified from the super-type BankAccount.

In an embodiment, whether the particular method, in the sub-type, is a valid override of the migrated method, in the super-type, is determined. If the method descriptor of the particular method is the same as a method descriptor of one version of the migrated method, then the override is valid. If the method descriptor of the particular method is not the same as a method descriptor of any version of the migrated method, then the override is not valid. If the override is not valid, then an error is generated.

In an embodiment, the determination of whether an override is valid is performed only if the particular method, in the sub-type, is associated with an annotation indicating that the particular method overrides a method of a super-type. In another embodiment, the determination of whether an override is valid is performed regardless of whether the particular method, in the sub-type, is associated with an annotation.

Referring to the example code above, the sub-type HighSecurityAccount includes Date lastAccessDate (int arg). The super-type BankAccount includes Date lastAccessDate (int arg) and Date lastAccessDate (long arg). Since the method descriptor of lastAccessDate in the sub-type is the same as the method descriptor of one version of lastAccessDate in the super-type, the override may be determined as valid.

In an embodiment, migration relationships between the versions of the migrated method are identified. The migration relationships between the versions of the migrated method are stored as part of the update type. The migration relationships are identified from the updated type. Additionally or alternatively, the migration relationships are identified based on references stored as part of the updated type. Based on the migration relationships, a sequence in which the versions of the migrated method were generated is determined. A current version of the migrated method is determined.

One or more embodiments include determining whether the particular set of types, associated with the set of arguments, is the same as the set of parameter types associated with the particular method in the sub-type (Operation 810). The particular set of types, associated with the set of arguments, was identified at Operation 802. The set of parameter types associated with the particular method in the sub-type was identified at Operation 804. The particular set of types, associated with the set of arguments, is compared to the set of parameter types associated with the particular method in the sub-type.

If the particular set of types, associated with the set of arguments, is the same as the set of parameter types associated with the particular method in the sub-type, then the particular method is stored in the runtime environment (Operation 822). The particular method may be stored as bytecode in the per-class area associated with the sub-type in the runtime environment. In particular, the particular method may be stored in the runtime environment without the need for identifying and/or applying any conversion functions for converting the set of arguments.

Referring to the example code above, the sub-type HighSecurityAccount includes Date lastAccessDate (int arg). The method Date lastAccessDate (int arg), which is explicitly defined by the source code of HighSecurityAccount, may be stored in a per-class area associated with the sub-type HighSecurityAccount. The method Date lastAccessDate (int arg), stored in the runtime environment, is configured to check the credentials of a requestor prior to returning a last access date of an account.

One or more embodiments include determining whether the particular set of types, associated with the set of arguments, is the same as a set of parameter types associated with any of the versions of the migrated method in the super-type (Operation 812). The particular set of types, associated with the set of arguments, was identified at Operation 802. The sets of parameter types associated with the versions of the migrated method were identified at Operation 808. The particular set of types, associated with the set of arguments, is compared to each set of parameter types associated with the versions of the migrated method.

If the particular set of types, associated with the set of arguments, is not the same as a set of parameter types associated with any of the versions of the migrated method in the super-type, then an error is returned (Operation 814).

One or more embodiments include identifying one or more conversion functions that convert (a) values of the particular set of types into (b) values of the set of parameter types associated with the particular method in the sub-type (Operation 816). The conversion function may be identified from the super-type (that is, the updated type), the sub-type, the class file identified at Operation 802, a separate file, and/or a separate database. As an example, an updated type may include a migrated method and a migration tag associated with the migrated method. The migration tag may identify a reference to a conversion function. The reference may be an index to a constant pool entry in the updated type. The conversion function may be identified from the constant pool table based on the index.

In an embodiment, a separate conversion function is used for each parameter of a migrated method. As an example, a migrated method may have the parameters arg1 and arg2. One version of the migrated method may specify that arg1 is of type int, and arg2 is of type char. Another version of the migrated method may specify that arg1 is of type double, and arg2 is of type long. Two separate conversion functions may be associated with arg1 and arg2, respectively. Specifically, a first conversion function, associated with arg1, may convert an int value into a double value. A second conversion function, associated with arg2, may convert a char value into a long value.

In an embodiment, a single conversion function is used for a set of parameters of a migrated method. As an example, a migrated method may have the parameters arg1 and arg2. One version of the migrated method may specify that arg1 is of type int, and arg2 is of type char. Another version of the migrated method may specify that arg1 is of type double, and arg2 is of type long. A single conversion function may convert a set of values comprising an int value and a char value into another set of values comprising a double value and a long value.

One or more embodiments include generating a new method (Operation 818). The new method includes instructions for (a) applying the conversion functions to convert (i) the set of arguments into (ii) values of the set of parameter types associated with the particular method in the sub-type, and (b) invoking the particular method, in the sub-type, using the converted values as arguments.

The new method includes instructions for applying the conversion functions to convert (i) the set of arguments into (ii) values of the set of parameter types associated with the particular method.

In an embodiment, as described above, a separate conversion function is used for each parameter of a migrated method. Hence, a separate conversion function is applied to each of the set of arguments specified in the instructions identified at Operation 802. The converted values, output from each conversion function, are input as arguments to the particular method.

In an embodiment, as described above, a single conversion function is used for a set of parameters of a migrated method. Hence, the single conversion function is applied to the set of arguments specified in the instructions identified at Operation 802. The converted values, output from the single conversion function, are input as parameters to the current version of the migrated method.

A single conversion function may be used to convert (i) the set of arguments into (ii) values of the set of parameter types associated with the particular method, as described above with reference to conversion functions 524 of FIG. 5. Alternatively, multiple conversion functions may be chained together to convert (i) the set of arguments into (ii) values of the set of parameter types associated with the particular method, as described above with reference to conversion functions 524 of FIG. 5.

Additionally, the new method includes instructions for invoking the particular method using the converted values as arguments. The particular method is invoked using the output from the conversion functions as arguments.

Referring to the example code above, the sub-type HighSecurityAccount includes Date lastAccessDate (int arg). The lastAccessDate method in the sub-type is configured to check the credentials of a requestor prior to returning a last access date of an account. The super-type BankAccount includes Date lastAccessDate (int arg) and Date lastAccessDate (long arg). The versions of lastAccessDate in the super-type are configured to return a last access date of an account. The versions of lastAccessDate in the super-type do not check the credentials of a requestor.

Based on an invocation of lastAccessDate on an instance of HighSecurityAccount using a long value as an argument, a new method is generated. The new method is associated with the sub-type HighSecurityAccount. The method descriptor of the new method is Date lastAccessDate (long arg). The new method may behave in a similar manner to the following code:

```
Date lastAccessDate(long arg) {
    int convertedarg = ParameterConversionFunction(arg);
    Date retval = this.lastAccessDate(convertedarg);
    return retval;
}
```

The line int convertedarg=ParameterConversionFunction (arg) corresponds to instructions converting (i) the set of arguments into (ii) values of the set of parameter types associated with the particular method. The set of arguments, arg, is input to the conversion function, ParameterConversionFunction. The output is an int value, convertedarg.

Additionally, the line Date retval=this.lastAccessDate (convertedarg) corresponds to instructions invoking the particular method (that is, Date lastAccessDate (int arg)) in the sub-type. The particular method is invoked since: (a) the argument to lastAccessDate is convertedarg, which is of type int, and (b) the particular method in the sub-type is associated with a parameter type of int. The particular method that is invoked is configured to check the credentials of a requestor prior to returning a last access date.

In this example, the method Date lastAccessDate (int arg), explicitly defined in the sub-type HighSecurityAccount, overrides the method Date lastAccessDate (int arg) included in the super-type BankAccount. The new method Date lastAccessDate (long arg), generated for the sub-type HighSecurityAccount, overrides the method Date lastAccessDate (long arg) included in the super-type BankAccount. The new method Date lastAccessDate (long arg) is not explicitly defined in the source code of the sub-type HighSecurityAccount.

One or more embodiments include storing the new method in the runtime environment (Operation 820). The new method may be stored as bytecode in the per-class area associated with the sub-type in the runtime environment. Optionally, the particular method, explicitly defined in the sub-type, may also be stored in the runtime environment.

One or more embodiments include executing a method resolved from the instructions to invoke the particular method identified at Operation 802 (Operation 824). As described above, instructions to invoke the particular method are identified at Operation 802. In an embodiment, the instructions include a symbolic reference to the particular method. During linkage of the class file, the symbolic reference to the particular method is resolved as a direct reference. If Operation 820 was performed, then the symbolic reference to the particular method is resolved as a direct reference to the new method that was stored in the runtime environment at Operation 820. Alternatively, if Operation 822 was performed, then the symbolic reference to the particular method is resolved as a direct reference to the particular method that was stored in the runtime environment at Operation 822. The runtime constant pool table is updated to reflect the resolution of (a) the symbolic reference to the particular method to (b) the direct reference to the new method or the particular method that is stored in the runtime environment.

During execution of the class file, the set of arguments, specified in the instructions identified at Operation 802, are loaded onto an operand stack. The program counter (PC), which references the next instruction to be executed, is moved to the resolved direct reference. Based on the PC, either the new method or the particular method is executed. Further, the loaded values on the operand stack are used as arguments for the execution of the method.

Additional and/or alternative methods for identifying the memory location associated with the method to be executed may be used. Additional and/or alternative methods for inputting and/or loading the set of arguments for the method may be used.

In an embodiment, upon a subsequent invocation of the particular method, using a set of arguments that are associated with the same particular set of types as that identified at Operation 802, it is not necessary to repeat the operations for generating the new method. The sub-type is determined as being previously loaded. The symbolic reference to the particular method is resolved as a direct reference to the new method that was previously generated and stored in the runtime environment. Based on the resolved direct reference, the new method is executed.

As further described below, a method corresponding to a sub-type is invoked using (a) a particular method name and (b) a particular return type. The sub-type includes a method associated with the particular method name, but with a different return type. Meanwhile, the super-type is an updated type that includes a migrated method. One version of the migrated method is a method associated with the particular method name and the same particular return type. A new method is generated to convert the return type output from the method in the sub-type.

Figure 9A:
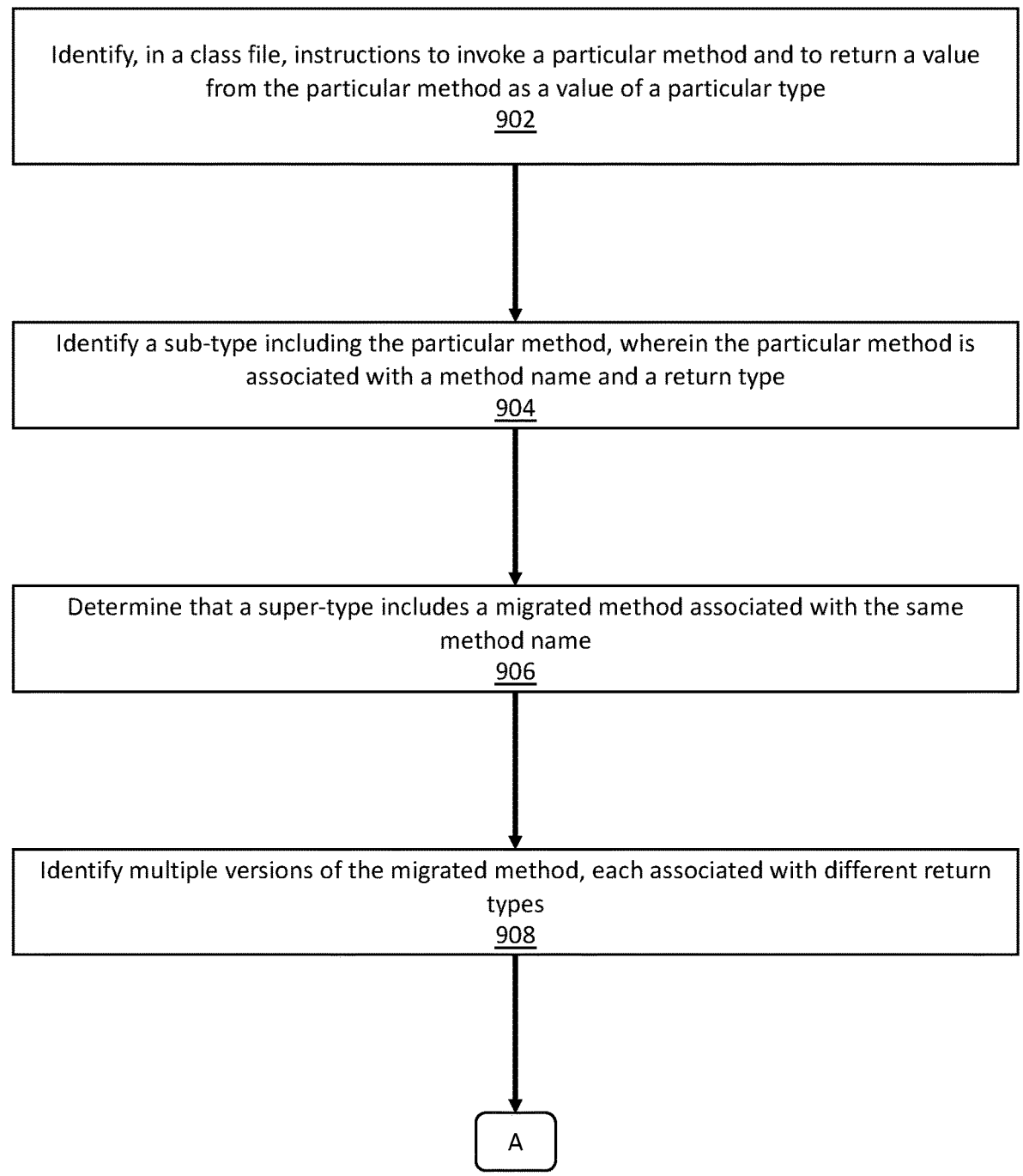
FIGS. 9A-B illustrate another set of operations for invoking a particular method that overrides a migrated method in an updated type, in accordance with one or more embodiments.
Figure 9B:
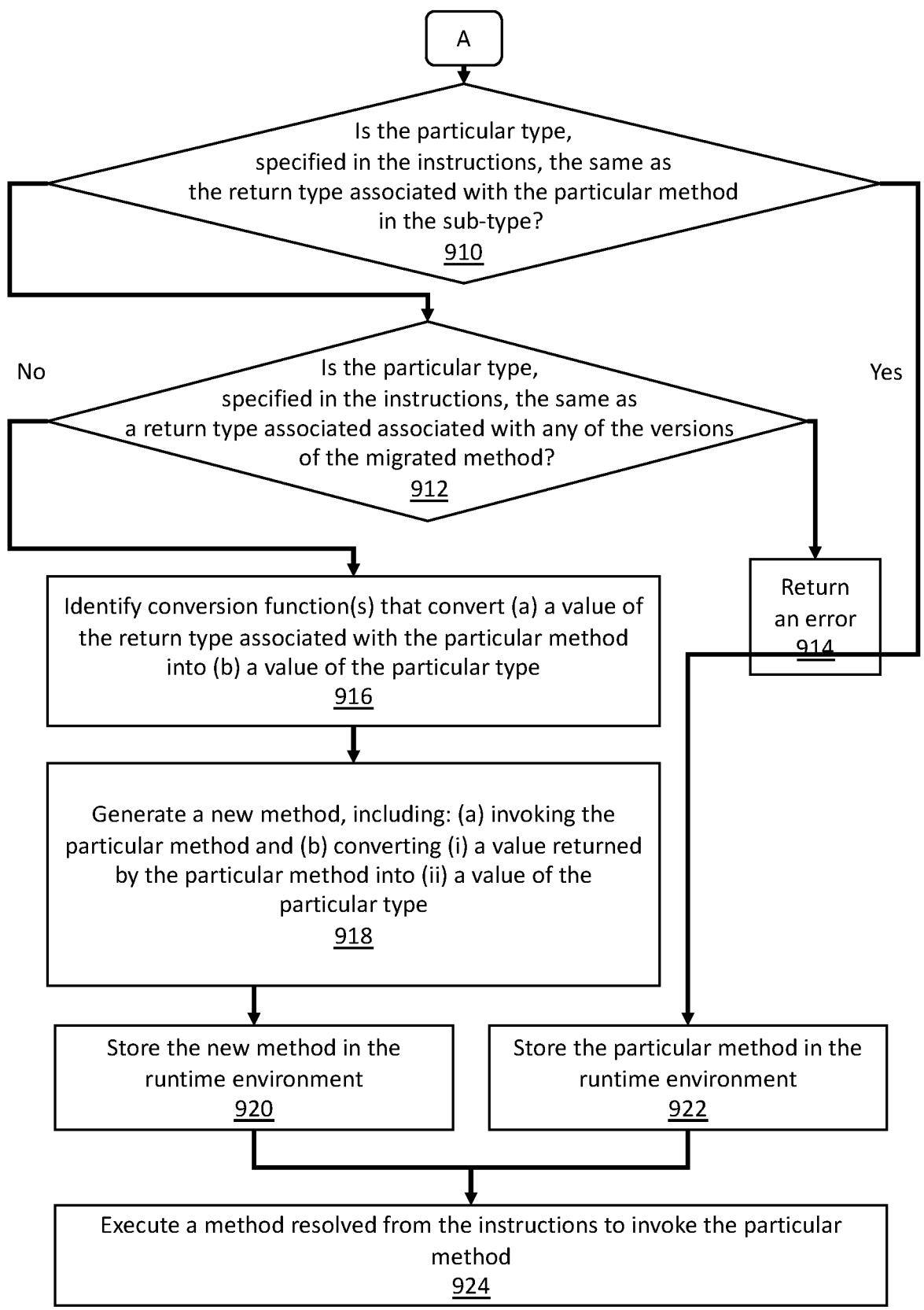

FIGS. 9A-B illustrate a set of operations for invoking a particular method that overrides a migrated method in an updated type, in accordance with one or more embodiments. Different versions of the migrated method are associated with different return types. One or more operations illustrated in FIGS. 9A-B may be modified, rearranged, or omitted all together. Accordingly, the particular sequence of operations illustrated in FIGS. 9A-B should not be construed as limiting the scope of one or more embodiments.

One or more embodiments include identifying, in a class file, instructions to invoke a particular method and to return a value from the particular method as a value of a particular type (Operation 902). Further descriptions relating to identifying instructions to invoke the particular method are included above with reference to Operation 802. The instructions identify (a) a method name of the particular method, and (b) the particular type associated with the value to be returned from the particular method.

Example code may be written as follows:

```
class Main {
    public static void main(String[ ] args) {
        HighSecurityAccount myaccount =
            new HighSecurityAccount( );
        int myarg = 3;
        NewDate dt = myaccount.lastAccessDate(myarg);
    }
}
```

The example code may be compiled into bytecode, which may be stored in a class file. The instructions to invoke the particular method and to return a value from the particular method as a value of a particular type include the bytecode corresponding to the line NewDate dt=myaccount.lastAccessDate (myarg). The bytecode corresponding to the line NewDate dt=myaccount.lastAccessDate (myarg) may include, for example, an invoke instruction and a store instruction. Based on the line NewDate dt=myaccount.lastAccessDate (myarg), a particular method, lastAccessDate, corresponding to the object, myaccount, is executed. A value returned from the particular method is stored as a value of the particular type, NewDate. Hence, the instructions identify (a) lastAccessDate as the particular method being invoked, and (b) NewDate as the particular type associated with the value to be returned from the particular method.

One or more embodiments include identifying a sub-type including the particular method, wherein the particular method is associated with a method name and a return type (Operation 904). Further descriptions relating to identifying the sub-type including the particular method are included above with reference to Operation 804.

A definition of the particular method is determined from the sub-type. The definition of the particular method indicates the method name and the return type associated with the particular method. The definition of the particular method also includes the method body of the particular method.

As an example, the sub-type HighSecurityAccount may include the following code:

```
class HighSecurityAccount extends BankAccount {
    @Override Date lastAccessDate(int arg) {
        ...           // check credentials first
    };
}
```

The example code may be compiled into bytecode, which may be stored in a class file. The particular method is defined by the bytecode corresponding to Date lastAccessDate (int arg) and the method body thereof. The method body may include instructions to check the credentials of a requestor prior to returning a last access date of an account. Based on the line Date lastAccessDate (int arg), the return type associated with the particular method is Date.

One or more embodiments include determining that a super-type includes a migrated method associated with the same method name (Operation 906). Further descriptions relating to identifying the super-type including the migrated method are included above with reference to Operation 806. Since the super-type includes a migrated method, the super-type may also be referred to as an "updated type."

Referring to the example code above, a sub-type may be HighSecurityAccount, which includes a method lastAccessDate. The super-type of HighSecurityAccount may be BankAccount. BankAccount may be an updated type including a migrated method associated with the same method name, lastAccessDate. BankAccount may include the following code:

```
class BankAccount {
    Date lastAccessDate(int arg) { ... };
    @MigratedFrom (Date lastAccessDate(int arg),
        ReturnConversionFunctionPair)
    NewDate lastAccessDate(int arg) { ... };
}
```

One or more embodiments include identifying multiple versions of the migrated method, each associated with different return types (Operation 908). Further descriptions relating to identifying multiple versions of the migrated method are included above with reference to Operation 808. Each version of the migrated method is associated with a same method name but different sets of parameter types and/or different return types.

Referring to the example code above, BankAccount includes multiple versions of a migrated method associated with the method name, lastAccessDate. One version corresponds to the line Date lastAccessDate (int arg). This version is associated with the return type, Date. Another version corresponds to the line NewDate lastAccessDate (int arg). This version is associated with the return type, NewDate. The versions of the migrated method are identified from the super-type BankAccount.

One or more embodiments include determining whether the particular type, specified in the instructions identified at Operation 902, is the same as the return type associated with the particular method in the sub-type (Operation 910). The particular type, associated with the value to be returned from the particular method, was identified at Operation 902. The return type associated with the particular method in the sub-type was identified at Operation 904. The particular type, associated with the value to be returned from the particular method, is compared to the return type associated with the particular method in the sub-type.

If the particular type, specified in the instructions identified at Operation 902, is the same as the return type associated with the particular method in the sub-type, then the particular method is stored in the runtime environment (Operation 922). Further descriptions relating to storing the particular method in the runtime environment are included above with reference to Operation 822.

Referring to the example code above, the sub-type HighSecurityAccount includes Date lastAccessDate (int arg). The method Date lastAccessDate (int arg), which is explicitly defined by the source code of HighSecurityAccount, may be stored in a per-class area associated with the sub-type HighSecurityAccount. The method Date lastAccessDate (int arg), stored in the runtime environment, is configured to check the credentials of a requestor prior to returning a last access date of an account.

One or more embodiments include determining whether the particular type, specified in the instructions identified at Operation 902, is the same as the return type associated with any of the versions of the migrated method in the super-type (Operation 912). The particular type, associated with the value to be returned from the particular method, was identified at Operation 902. The return types associated with the versions of the migrated method were identified at Operation 908. The particular type, associated with the value to be returned from the particular method, is compared to each return type associated with the versions of the migrated method.

If the particular type, specified in the instructions identified at Operation 902, is not the same as the return type associated with any of the versions of the migrated method in the super-type, then an error is returned (Operation 914).

One or more embodiments include identifying one or more conversion functions that convert (a) a value of the return type associated with the particular method, in the sub-type, into (b) a value of the particular type specified in the instructions identified at Operation 902 (Operation 916). Further descriptions relating to identifying conversion functions are described above with reference to Operation 816.

One or more embodiments include generating a new method (Operation 918). The new method includes instructions for (a) invoking the particular method in the sub-type, and (b) applying the conversion functions to convert (i) a value returned by the particular method into (ii) a value of the particular type specified in the instructions identified at Operation 902.

The new method includes instructions for invoking the particular method. The value returned from the particular method is stored as a temporary value.

Additionally, the new method includes instructions for applying the conversion functions to convert (i) the value returned by the particular method (that is, the temporary value) into (ii) a value of the particular type. Further descriptions relating to applying conversion functions are included above with reference to Operation 818.

Referring to the example code above, the sub-type HighSecurityAccount includes Date lastAccessDate (int arg). The super-type BankAccount includes Date lastAccessDate (int arg) and NewDate lastAccessDate (int arg).

Based on instructions to invoke lastAccessDate on an instance of HighSecurityAccount and to return a NewDate value from lastAccessDate, a new method is generated. The new method is associated with the sub-type HighSecurity- Account. The method descriptor of the new method is NewDate lastAccessDate (int arg). The new method may behave in a similar manner to the following code:

```
NewDate lastAccessDate(int arg) {
    Date temp = this.lastAccessDate(arg);
    NewDate retval = ReturnConversionFunction(temp);
    return retval;
}
```

The line NewDate temp=this.lastAccessDate (arg) corresponds to instructions invoking the particular method (that is, Date lastAccessDate (int arg)) in the sub-type. The particular method is invoked since: (a) the value to be returned from lastAccessDate is temp, which is of type Date, and (b) the particular method in the sub-type is associated with a return type of Date. The particular method that is invoked is configured to check the credentials of a requestor prior to returning a last access date.

Additionally, the line NewDate retval=ReturnConversionFunction (temp) corresponds to instructions converting (i) the value returned by the particular method into (ii) a value of the particular type. The value returned by the particular method, temp, is input to the conversion function, ReturnConversionFunction. The output is a NewDate value, retval. The NewDate value, retval, is returned from the new method.

In this example, the method Date lastAccessDate (int arg) explicitly defined in the sub-type HighSecurityAccount overrides the method Date lastAccessDate (int arg) included in the super-type BankAccount. The new method NewDate lastAccessDate (int arg) generated for the sub-type HighSecurityAccount overrides the method NewDate lastAccessDate (int arg) included in the super-type BankAccount. The new method NewDate lastAccessDate (int arg) is not explicitly defined in the source code of the sub-type HighSecurityAccount.

One or more embodiments include storing the new method in the runtime environment (Operation 920). Further descriptions relating to storing the new method in the runtime environment are included above with reference to Operation 820.

One or more embodiments include executing a method resolved from the instructions to invoke the particular method identified at Operation 902 (Operation 924). As described above, instructions to invoke the particular method are identified at Operation 902. In an embodiment, the instructions include a symbolic reference to the particular method. During linkage of the class file, the symbolic reference to the particular method is resolved as a direct reference. If Operation 920 was performed, then the symbolic reference to the particular method is resolved as a direct reference to the new method that was stored in the runtime environment at Operation 920. Alternatively, if Operation 922 was performed, then the symbolic reference to the particular method is resolved as a direct reference to the particular method that was stored in the runtime environment at Operation 922. The runtime constant pool table is updated to reflect the resolution of (a) the symbolic reference to the particular method to (b) the direct reference to the new method or the particular method that is stored in the runtime environment.

During execution of the class file, the program counter (PC), which references the next instruction to be executed, is moved to the resolved direct reference. Based on the PC, either the new method or the particular method is executed. The value returned from the executed method is a value of the particular type specified in the instructions identified at Operation 902.

Additional and/or alternative methods for identifying the memory location associated with the method to be executed may be used.

In an embodiment, upon a subsequent execution of one or more instructions to return a value from the particular method, wherein the value is associated with the same particular type as that identified at Operation 902, it is not necessary to repeat the operations for generating the new method. The sub-type is determined as being previously loaded. The symbolic reference to the particular method is resolved as a direct reference to the new method that was previously generated and stored in the runtime environment. Based on the resolved direct reference, the new method is executed.

In one or more embodiments, a particular method that overrides a migrated method in an updated type may be invoked. Different versions of the migrated method are associated with different sets of parameter types as well as different return types. Operations illustrated in FIGS. 9A-B and operations in FIGS. 10A-B are combined in order to execute the particular method. In particular, based on the invocation of the particular method, a new method is generated and stored in the runtime environment. The new method includes instructions for converting the set of arguments used for invoking the particular method and for converting a value returned from the particular method.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
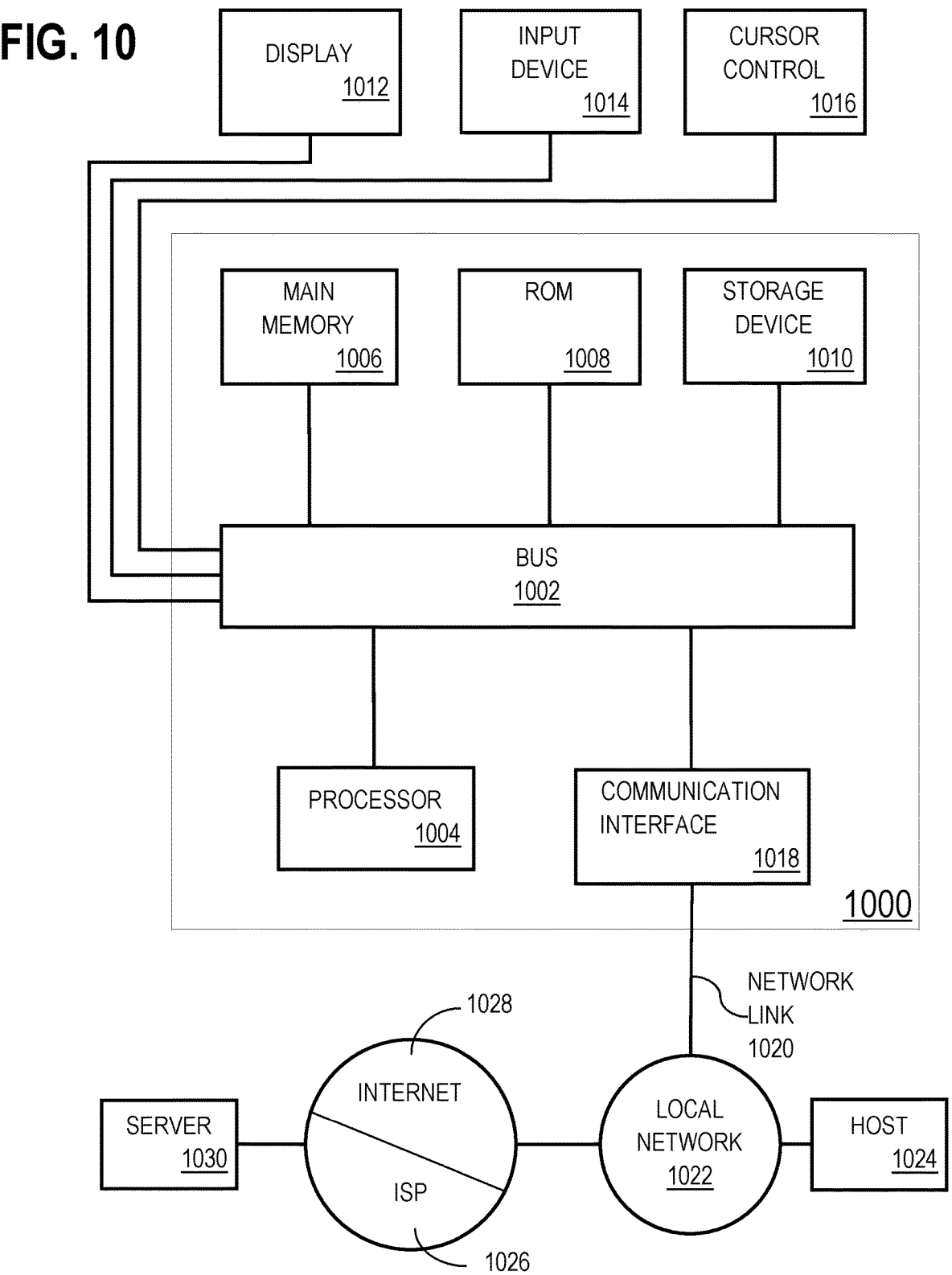
FIG. 10 illustrates a system in accordance with one or more embodiments.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions, which when executed by one or more hardware processors, cause performance of operations comprising:
   identifying one or more instructions to invoke a particular method corresponding to a particular object, using values corresponding to a particular set of types as arguments, wherein the particular method is in a sub-type and referenced by a particular method name;
   determining that the sub-type comprises:
      a first method associated with the particular method name and a first set of parameter types;
      wherein the sub-type does not include any method associated with the particular method name and a second set of parameter types;
   identifying a super-type of the sub-type;
   determining that the super-type comprises:
      a second method associated with the particular method name and the first set of parameter types;
      a third method associated with the particular method name and the second set of parameter types;
      wherein the second method was migrated to the third method;
   responsive to determining that the particular set of types is same as the second set of parameter types of the third method that was migrated to from the second method:
      generating a new method, the new method comprising:
         instructions to apply a conversion function to convert the values corresponding to the particular set of types into values corresponding to the first set of parameter types;
         instructions to invoke the first method using the values corresponding to the first set of parameter types;
   executing the new method.

2. The medium of claim 1, wherein the operations further comprise:
   storing the new method in a runtime environment.

3. The medium of claim 1, wherein the operations further comprise:
   identifying a symbolic reference to the particular method in the instructions; and
   resolving the symbolic reference as a direct reference to the new method.

4. The medium of claim 3, wherein the operations further comprise:
   storing a resolution of (a) the symbolic reference to the particular method in the instructions to (b) the direct reference to the new method in a runtime constant pool table.

5. The medium of claim 1, wherein the new method is not included in a set of source code defining the sub-type.

6. The medium of claim 1, wherein the operations further comprise:
   identifying the conversion function based on a migration tag, associated with at least one of the second method and the third method, included in the super-type.

7. The medium of claim 1, wherein:
   the instructions to invoke the particular method include instructions to return a first value from the particular method as a second value of a particular type;
   the first method, in the sub-type, is further associated with a first return type;
   the second method, in the super-type, is further associated with the first return type;
   the third method, in the super-type, is further associated with a second return type;
   the new method is generated further responsive to determining that the particular type is same as the second return type;
   the new method further comprises:
      instructions to return a third value from the first method, wherein the third value is of the first return type;
      instructions to apply a second conversion function to convert the third value into a fourth value of the second return type;
      instructions to return the fourth value as the second value of the particular type.

8. A method, comprising:
   identifying one or more instructions to invoke a particular method corresponding to a particular object, using values corresponding to a particular set of types as arguments, wherein the particular method is in a sub-type and referenced by a particular method name;
   determining that the sub-type comprises:
      a first method associated with the particular method name and a first set of parameter types;
      wherein the sub-type does not include any method associated with the particular method name and a second set of parameter types;
   identifying a super-type of the sub-type;
   determining that the super-type comprises:
      a second method associated with the particular method name and the first set of parameter types;
      a third method associated with the particular method name and the second set of parameter types;
      wherein the second method was migrated to the third method;
   responsive to determining that the particular set of types is same as the second set of parameter types of the third method that was migrated to from the second method:
      generating a new method, the new method comprising:
         instructions to apply a conversion function to convert the values corresponding to the particular set of types into values corresponding to the first set of parameter types;
         instructions to invoke the first method using the values corresponding to the first set of parameter types;
   executing the new method;
   wherein the method is performed by at least one device including a hardware processor.

9. The method of claim 8, wherein the operations further comprise:
   storing the new method in a runtime environment.

10. The method of claim 8, further comprising:
    identifying a symbolic reference to the particular method in the instructions; and
    resolving the symbolic reference as a direct reference to the new method.

11. The method of claim 10, further comprising:
    storing a resolution of (a) the symbolic reference to the particular method in the instructions to (b) the direct reference to the new method in a runtime constant pool table.

12. The method of claim 8, wherein the new method is not included in a set of source code defining the sub-type.

13. A system, comprising:
    at least one device including a hardware processor; and
    the system configured to perform operations comprising:
      identifying one or more instructions to invoke a particular method corresponding to a particular object, using values corresponding to a particular set of types as arguments, wherein the particular method is in a sub-type and referenced by a particular method name;
      determining that the sub-type comprises:
        a first method associated with the particular method name and a first set of parameter types;
        wherein the sub-type does not include any method associated with the particular method name and a second set of parameter types;
      identifying a super-type of the sub-type;
      determining that the super-type comprises:
        a second method associated with the particular method name and the first set of parameter types;
        a third method associated with the particular method name and the second set of parameter types;
        wherein the second method was migrated to the third method;
      responsive to determining that the particular set of types is same as the second set of parameter types of the third method that was migrated to from the second method:
        generating a new method, the new method comprising:
          instructions to apply a conversion function to convert the values corresponding to the particular set of types into values corresponding to the first set of parameter types;
          instructions to invoke the first method using the values corresponding to the first set of parameter types;
      executing the new method.

14. The system of claim 13, wherein the operations further comprise:
    storing the new method in a runtime environment.

15. The system of claim 13, wherein the operations further comprise:
    identifying a symbolic reference to the particular method in the instructions; and
    resolving the symbolic reference as a direct reference to the new method.

16. The system of claim 15, wherein the operations further comprise:
    storing a resolution of (a) the symbolic reference to the particular method in the instructions to (b) the direct reference to the new method in a runtime constant pool table.

17. The system of claim 13, wherein the new method is not included in a set of source code defining the sub-type.

* * * * *